March 16, 1954   J. C. F. KESSLER ET AL   2,671,930
FILLING EXTRUDER
Filed Nov. 6, 1952
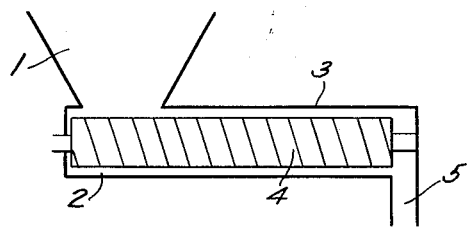
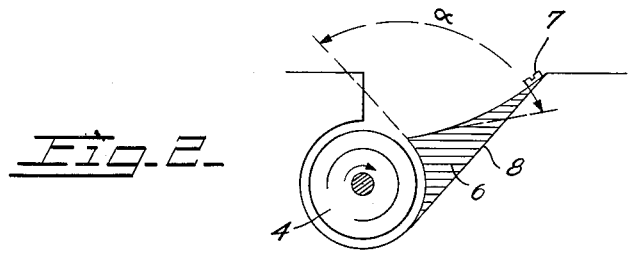
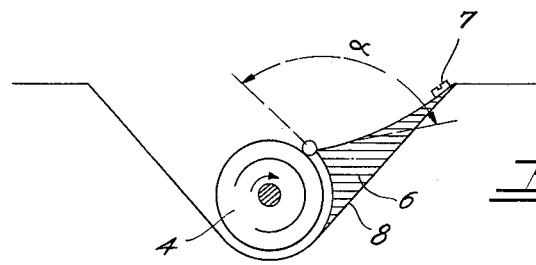
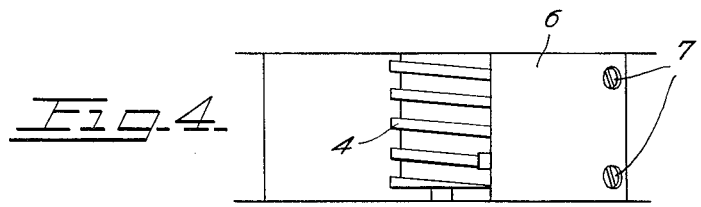
INVENTORS
JACOB C. F. KESSLER
JOHANNES BOETJE
JOHANN F. KOHLWEY
BY
*Stevens, Davis, Miller and Mosher*
ATTORNEYS Patented Mar. 16, 1954

2,671,930

UNITED STATES PATENT OFFICE 2,671,930

FILLING EXTRUDER

Jacob Christoffel Ferdinand Kessler, Velp, Johannes Boetje, Arnhem, and Johann Friedrich Kohlwey, Velp, Netherlands, assignors to N. V. Onderzoekingsinstituut Research, Arnhem, Netherlands, a corporation of the Netherlands Application November 6, 1952, Serial No. 318,972

Claims priority, application Netherlands December 21, 1951

5 Claims. (Cl. 18—12)

This invention relates to an extrusion apparatus for extruding material such as thermoplastic material and more particularly to an improvement in the material supply opening in such apparatus.

The conventional type of extruding apparatus includes an elongated screw conveyor with a housing concentrically located thereabout, an inlet opening in the housing for the supply of material thereto and an outlet opening in the housing for the extrusion of the material. When such apparatus is used to handle granular material, a serious problem arises, particularly when the shape of the grains deviates from a spherical form, for instance to a cylindrical form. These grains are cylindrical in shape, usually about 5 mm. in length and from 2 to 3 mm. in diameter. The grains when supplied to the conventional type of extrusion apparatus often become lodged between the threads of the screw conveyor and the housing. The grains are extremely strong and tough and in many cases have been known to jam the screw conveyor to the extent that the device ceases to operate.

It is therefore an object of this invention to provide an improved extrusion apparatus which eliminates this jamming problem.

These and other objects will become apparent from the following detailed description of the accompanying drawing, in which Figure 1 is a schematic representation of the conventional type of extrusion apparatus;

Figures 2 and 3 are vertical cross-sectional views of two embodiments of the invention showing the improvement to the inlet opening to the apparatus for the supply of material thereto; and Figure 4 is a fragmentary elevational view of the embodiment of Figure 3.

Referring to Figure 1, the filling funnel 1 leads the material into the filling space 2 which is formed between the housing 3 and the screw conveyor 4. This screw conveyor 4 is mounted in the usual fashion to the housing 3 and rotatably driven to convey the material from the opening at the bottom of the funnel 1 to the discharge opening 5. This discharge opening 5 usually leads to a device such as a mold (not shown). Additionally, heating means (not shown) are usually supplied in the case of thermoplastic material such as polyamide material to convert such material to a molten mass during its travel from the funnel to the discharge opening.

In the conventional extrusion apparatus, the walls of the funnel and of the filling space lying underneath have a shape as shown in Figures 2 and 3 without the shaded portion 6. In such cases the grains can easily become jammed between the threads of the screw conveyor and the housing. It has now been discovered that by modifying one of these walls of the funnel, such as wall 8 in Figures 2 and 3, this jamming problem is largely eliminated. To wall 8 is mounted by such means as screws 7, an insert 6. The insert 6 is placed on a particular wall of the funnel, namely the wall that extends downwardly to the side of said screw conveyor that moves away from said opening during its rotation.

It will be noted that in Figures 2 and 3 arrows have been inserted to indicate the direction of rotation of the screw conveyor. It will be noted that the insert 6 is placed on the downwardly moving side of the screw conveyor, that is, the side of the screw conveyor that moves away from the funnel opening. It is this wall of the funnel that is modified by the insert to form a new wall. Of course, in new equipment the insert may be replaced by a new wall entirely, forming an integral piece with the other walls of the funnel. The insert is used to modify existing apparatus, the point being that the ultimate shape of the wall is the important thing rather than how the shape is obtained, that is, by an integral wall or by an insert. The insert 6 or new wall terminates adjacent the periphery of the screw conveyor 4 and forms an angle alpha with a plane parallel to a plane tangent to the periphery at a point thereon opposite the point at which the wall terminates. The new wall at least partially surrounds the screw conveyor 4 and is at a distance from the periphery thereof equal to or less than the smallest dimension of the grains of material being extruded, as shown in Figure 3.

By so constructing the particular wall of the funnel above identified, the jamming problem is practically eliminated. The grains only get between the various threads where they belong and not between the threads and the housing. This effect is obtained if an angle alpha is 90° but preferably alpha should be greater than 90° and usually about 120° to about 140°.

What have been disclosed are specific embodiments of the invention. Other embodiments obvious from the teachings herein to those skilled in the art are contemplated to be within the spirit and scope of the following claims.

What is claimed is:

1. An extrusion apparatus comprising a rotatable screw conveyor, a housing surrounding but spaced from the threads of said conveyor, said housing having a funnel therein for directing a supply of granulated material to said screw conveyor and having a discharge opening remote from said funnel for extruding said material, the wall of said funnel extending downwardly to that side of said screw conveyor that moves away from said opening during its rotation terminating adjacent the periphery of said screw conveyor and forming an angle of at least 90° with a plane parallel to a plane tangent to said periphery at a point thereon opposite said point of termination.

2. An extrusion apparatus as defined in claim 1 further characterized in that the said angle is between 120° and 140°.

3. An extrusion apparatus as claimed in claim 1 further characterized in that said wall terminates a distance from said periphery no greater than the smallest dimension of the grains of said material.

4. An extrusion apparatus as claimed in claim 3 further characterized in that said wall maintains said distance and concentrically surrounds said screw conveyor for at least a portion of said periphery.

5. An extrusion apparatus as claimed in claim 1 further characterized in that said wall is comprised of an insert mounted to the existing wall of said funnel.

JACOB CHRISTOFFEL FERDINAND KESSLER.
JOHANNES BOETJE.
JOHANN FRIEDRICH KOHLWEY.

References Cited in the file of this patent

UNITED STATES PATENTS

| Number | Name | Date |
|---|---|---|
| 1,066,722 | Ganzhorn | July 8, 1913 |
| 2,422,722 | Fielitz | June 24, 1947 |

FOREIGN PATENTS

| Number | Country | Date |
|---|---|---|
| 150,754 | Great Britain | Sept. 16, 1920 |